(12) United States Patent
Hasek

(10) Patent No.: US 10,405,048 B2
(45) Date of Patent: *Sep. 3, 2019

(54) METHODS AND APPARATUS FOR SUPPORTING VOD REQUESTS IN A SYSTEM WITH HIERARCHICAL CONTENT STORES

(71) Applicant: Time Warner Cable Enterprises LLC, St. Louis, MO (US)

(72) Inventor: Charles Hasek, Broomfield, CO (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/155,977

(22) Filed: May 16, 2016

(65) Prior Publication Data

US 2016/0261920 A1    Sep. 8, 2016

Related U.S. Application Data

(63) Continuation of application No. 14/028,223, filed on Sep. 16, 2013, now Pat. No. 9,363,567, which is a
(Continued)

(51) Int. Cl.
*H04N 7/173* (2011.01)
*H04N 21/2225* (2011.01)
(Continued)

(52) U.S. Cl.
CPC ... *H04N 21/47217* (2013.01); *H04L 65/4084* (2013.01); *H04N 7/17336* (2013.01); *H04N 21/2183* (2013.01); *H04N 21/2225* (2013.01); *H04N 21/26616* (2013.01); *H04N 21/47202* (2013.01)

(58) Field of Classification Search
None
See application file for complete search history.

(56) References Cited

U.S. PATENT DOCUMENTS 5,377,051 A * 12/1994 Lane .................... G11B 5/0086
                                                          348/E5.007
5,583,650 A * 12/1996 Lane .................... G11B 15/1875
                                                          348/E5.007
(Continued)

*Primary Examiner* — Alexander Q Huerta
(74) *Attorney, Agent, or Firm* — Straub & Straub; Michael P. Straub; Stephen T. Straub

(57) ABSTRACT

Methods and apparatus for supporting video on demand requests in a system supporting hierarchical content stores, e.g., program caches, is described. Requested content is requested by a local streaming device from a remote cache when it is not available in a local cache. Content, e.g., I, P and B frames, supplied by the remote cache is tracked and content delivery is initiated prior to receipt of the full program from the remote content store. Trick play content is requested as needed from the remote content store to respond to trick play commands. Frames which are received as part of the trick play content stream are tracked and not included in normal play data subsequently obtained from the remote cache. The storage of the trick play data along with subsequent normal play data results in a full set of the program content being received and stored in a local cache for streaming in response to a VOD request.

17 Claims, 10 Drawing Sheets

Related U.S. Application Data continuation of application No. 12/628,191, filed on Nov. 30, 2009, now Pat. No. 8,539,535.

(51) Int. Cl.
*H04N 21/266* (2011.01)
*H04N 21/472* (2011.01)
*H04L 29/06* (2006.01)
*H04N 21/2183* (2011.01)

(56) References Cited

U.S. PATENT DOCUMENTS

| | | | | |
|---|---|---|---|---|
| 5,592,343 A * | 1/1997 | Park | H04N 9/8042 | 360/48 |
| 5,623,344 A * | 4/1997 | Lane | G11B 15/1875 | 348/E5.007 |
| 5,726,711 A * | 3/1998 | Boyce | H04N 5/783 | 348/408.1 |
| 5,740,307 A * | 4/1998 | Lane | G11B 15/087 | 386/343 |
| 5,799,128 A * | 8/1998 | Van Den Enden | H04N 5/783 | 386/353 |
| 5,867,625 A * | 2/1999 | McLaren | H04N 5/783 | 348/E7.073 |
| 6,064,794 A * | 5/2000 | McLaren | H04N 5/91 | 386/343 |
| 6,065,050 A * | 5/2000 | DeMoney | H04N 7/17318 | 348/E7.071 |
| 6,222,981 B1 * | 4/2001 | Rijckaert | G11B 5/0086 | 386/314 |
| 6,445,738 B1 * | 9/2002 | Zdepski | G11B 27/034 | 375/240.01 |
| 6,621,979 B1 * | 9/2003 | Eerenberg | H04N 5/783 | 386/346 |
| 7,231,132 B1 * | 6/2007 | Davenport | H04N 5/783 | 348/E5.008 |
| 7,610,605 B2 * | 10/2009 | Negishi | H04N 5/783 | 386/343 |
| 8,079,052 B2 * | 12/2011 | Chen | G06Q 30/02 | 725/102 |
| 8,194,739 B2 * | 6/2012 | Boyce | H04N 21/2387 | 375/240.13 |
| 8,472,792 B2 * | 6/2013 | Butt | G11B 20/10 | 386/345 |
| 8,498,520 B2 * | 7/2013 | Pejhan | H04N 5/783 | 386/326 |
| 9,094,737 B2 * | 7/2015 | Shivadas | H04N 21/8455 | |
| 2002/0039450 A1 * | 4/2002 | Kimoto | G06T 9/004 | 382/239 |
| 2004/0244058 A1 * | 12/2004 | Carlucci | G06F 3/0482 | 725/135 |
| 2004/0267952 A1 * | 12/2004 | He | H04L 29/06027 | 709/231 |
| 2005/0019006 A1 * | 1/2005 | Suh | H04N 5/4401 | 386/344 |
| 2005/0038899 A1 * | 2/2005 | Banerjee | H04L 29/06 | 709/231 |
| 2005/0094808 A1 * | 5/2005 | Pedlow, Jr. | G11B 27/005 | 380/200 |
| 2005/0097614 A1 * | 5/2005 | Pedlow, Jr. | H04N 7/17318 | 725/90 |
| 2005/0198341 A1 * | 9/2005 | Michel | H04N 7/17309 | 709/231 |
| 2006/0080167 A1 * | 4/2006 | Chen | G06Q 30/02 | 705/14.68 |
| 2006/0093318 A1 * | 5/2006 | Cohen | G11B 27/005 | 386/345 |
| 2006/0117357 A1 * | 6/2006 | Surline | H04N 5/783 | 725/90 |
| 2006/0136581 A1 * | 6/2006 | Smith | H04L 41/145 | 709/224 |
| 2006/0277581 A1 * | 12/2006 | Eliyahu | H04N 5/76 | 725/88 |
| 2006/0285686 A1 * | 12/2006 | Van Den Heuvel | H04L 63/0435 | 380/200 |
| 2008/0148327 A1 * | 6/2008 | Xu | H04N 7/17336 | 725/105 |
| 2008/0168133 A1 * | 7/2008 | Osborne | H04N 5/76 | 709/203 |
| 2009/0132721 A1 * | 5/2009 | Soroushian | G06F 17/30056 | 709/231 |
| 2009/0141888 A1 * | 6/2009 | Kim | H04N 5/76 | 380/42 |
| 2009/0178087 A1 * | 7/2009 | Menn | H04L 1/1838 | 725/86 |
| 2009/0282444 A1 * | 11/2009 | Laksono | H04N 7/17336 | 725/89 |
| 2010/0003008 A1 * | 1/2010 | Thomas | H04N 5/783 | 386/344 |
| 2010/0158130 A1 * | 6/2010 | Chen | H04N 19/70 | 375/240.25 |
| 2010/0180043 A1 * | 7/2010 | Lau | H04N 21/23106 | 709/231 |
| 2010/0215338 A1 * | 8/2010 | Rodriguez | H04N 5/76 | 386/343 |
| 2010/0246670 A1 * | 9/2010 | Takemoto | G11B 27/005 | 375/240.02 |
| 2010/0271463 A1 * | 10/2010 | Gutierrez Novelo | H04N 19/597 | 348/43 |
| 2011/0116772 A1 * | 5/2011 | Kwon | H04N 21/23439 | 386/343 |
| 2013/0294743 A1 * | 11/2013 | Thornberry | G11B 27/034 | 386/239 |

* cited by examiner

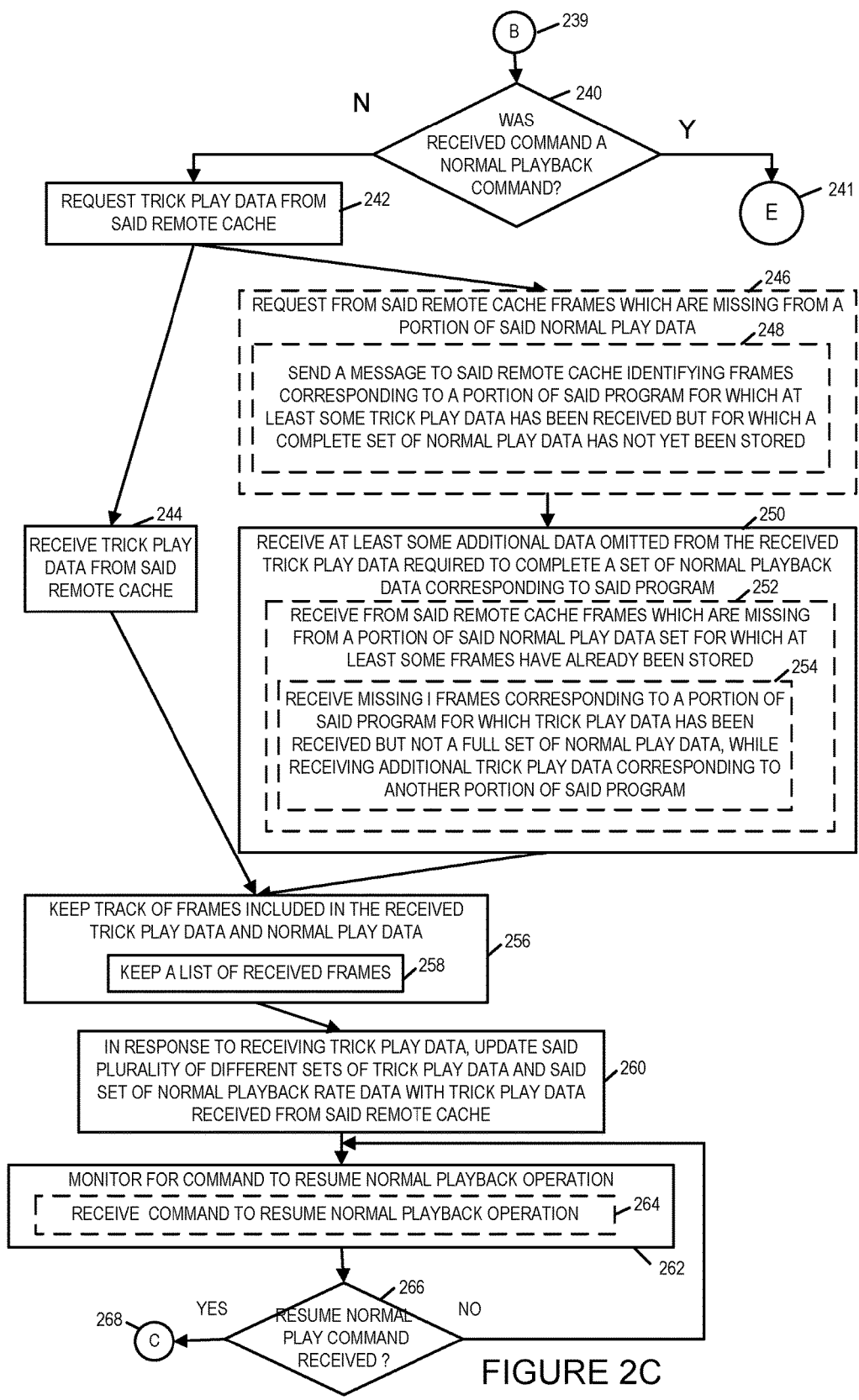

METHODS AND APPARATUS FOR SUPPORTING VOD REQUESTS IN A SYSTEM WITH HIERARCHICAL CONTENT STORES

RELATED APPLICATIONS

The present application is a continuation of U.S. patent application Ser. No. 14/028,223, filed on Sep. 16, 2013 which is a continuation of U.S. patent application Ser. No. 12/628,191, filed on Nov. 30, 2009 and titled "METHODS AND APPARATUS FOR SUPPORTING VOD REQUESTS IN A SYSTEM WITH HIERARCHICAL CONTENT STORES", each of which is hereby expressly incorporated by reference in its entirety.

FIELD

The present application relates to audio and/or video content distribution, and more particularly to methods and apparatus for controlling storing and streaming of program content in a hierarchical system supporting trick play options.

BACKGROUND

Video on demand services are becoming more common. While in the past, customers may have been satisfied with a relatively small number, e.g., a few hundred, programs, e.g., TV, movie and/or audio programs, to choose from, user's expectations with regard to being able to select from large numbers, e.g., thousands of titles, are ever increasing. User expectation with regard to access to ever greater numbers of programs is further complicated by increasing user expectations with regard to prompt access to selected content. While in the past customers were often willing to wait hours or even days for an obscure program to be available, customers are seeking and expecting relatively prompt access to selected content and expect such prompt access whether or not a program is in high demand by the public.

While the cost of storage continues to decrease, it remains impractical to store all possible programs which a user might request in a local cache. For this reason, some systems rely on local storage of programs which are in high demand while local content with programs which are in lower demand being stored in remote storage sites, e.g., remote caches, from which content can be requested in the event that the content is not locally available for delivery to a user.

In the case of content obtained from a remote cache, many systems wait for the full program content to be locally stored and then make the content available to the user from the local store. In such systems, since the content does not begin being supplied, e.g., streamed, to the user device until the program is stored at the local storage site, e.g., local cache, by the time the content begins being streamed a full copy of the requested program is locally available and there is no need for the streaming device to seek further content from the remote device, e.g., to satisfy a fast forward or other trick play request that might be issued while the requested program content is being streamed to the user.

While loading a complete copy of a requested program into a local cache prior to the start of content delivery to the user device avoids the risk of being unable to respond to a trick play command in a prompt fashion, it involves a delay corresponding to the amount of time needed to transfer the entire program from the remote cache where it is available to the local cache. Assuming a data transfer rate for the program between the remote and local cache corresponding to the data rate at which the program is streamed to the user, the requesting user would have to wait an amount of time corresponding to the full duration of the program before a requested program would be available for streaming from the local cache.

Using a much higher data transfer rate between the remote cache node and the local cache node can reduce the time required to transfer the program content. However, higher data rate communications links are often more costly than lower data rate links. Furthermore, even at transfer rates of 10 or 20 times the data rate used to stream content to the end user, the delay before a lengthy program may be fully transferred from a remote cache to a local cache from which it can be delivered to an end user can be considerable.

If trick play support for fast forwarding and other trick play commands which might require accessing a portion of a program not already present in a local cache were not supported, a system could begin streaming content from a local cache before the full program was stored in the local cache. However, the failure to support trick play commands is considered unsatisfactory to some users and supporting trick play commands for some programs, e.g., those which are stored locally, but not others, e.g., those which are being obtained from a remote cache, is highly confusing to users.

In view of the above discussion, it should be appreciated that there is a need for methods and apparatus which allow content to be obtained from a remote source, e.g., remote cache and begin being streamed to a user prior to the full program being stored locally while still supporting trick play commands such as fast forward. It is desirable that the method and apparatus allow content to be obtained from the remote cache for delivery to a user device at a rate which is equal to or not much higher than the rate at which content is streamed to the user device. It is also desirable if, in at least some embodiments, data communications links between remote caches and local caches from which data may be obtained for streaming are used efficiently, e.g., without multiple copies of the same data being transmitted multiple time.

SUMMARY

Methods and apparatus supporting the efficient use of bandwidth in a content distribution system, e.g., a video on demand (VOD) content distribution system, are described.

In various embodiments the methods allow program content, e.g., frames, to be supplied by a remote cache, stored in a local cache, and supplied to a device used to present the program to a user without the user having to wait for the full program to be supplied from the remote cache to the local cache before playback can begin. In addition, trick play commands can be supported even though the full program has not been transferred from the remote cache to the local cache. While trick play file data may be sent from the remote cache to a VOD server and/or local cache to support VOD requests by a user, content sent from the remote cache to support trick playback operations is tracked. Frames communicated as part of the trick play content stream sent from the remote cache to the VOD server and/or local cache, are not resent from the remote cache when the VOD server resumes normal playback operation. Similarly if the VOD server and/or local cache transfer normal playback data to the VOD server and/or local cache at some other time, e.g., while trick play data is transferred, data corresponding to frames communicated in the trick play data stream need not be re-communicated.

Thus, program content can be streamed from a local VOD server before the local VOD server has access to a complete local copy of the program but the early streaming and trick play support does not add significantly to the overall demand for bandwidth between the remote cache and the VOD server and/or local cache since content is sent a single time from the remote cache to the VOD server and/or local cache. Furthermore, for a given supported data rate from the remote cache, the amount of time required to transfer the complete program from the remote cache to the local cache or the VOD server remains relatively predictable and is unaffected or little affected by trick play requests.

While, in the context of the present device a streamer apparatus is described as a combination of a VOD server and local cache, it should be appreciated that the hardware configuration in terms of how the VOD server and local content storage functions are separated or implemented in a single unit may vary on the particular deployment. Accordingly, it should be understood that a streamer may be implemented as a VOD server working in combination with a local cache, e.g., data store and data management system. Alternatively, the VOD server and cache functionality may be implemented as a single device. For purposes of explaining the present invention, the streamer apparatus, the one or more devices which work to locally store and stream content to a customer premise device such as a STB, will often be referred to as a streamer node or simply a streamer. The streamer is often implemented at a headend office, e.g., a cable network headend serving multiple customer premise locations, e.g., each with one or more customer premise devices such as set top boxes (STBs) or televisions capable of receiving content and sending VOD content selection information and playback commands, e.g., trick play or normal playback commands.

In one exemplary embodiment an apparatus responsible for streaming content for delivery to a customer premise device, e.g., set top box, in response to a user request monitors for content, e.g., program, requests. Nodes which stream content to a customer premise device are sometimes referred to as streamer nodes or simply streamers. A streamer may be a local cable headend node which includes a video on demand server with access to a local cache including program content. The local cache may be physically located at the local cable network headend or accessible thereto in a manner that allows content requests which can be satisfied from the local cache to be satisfied in real time or near real time.

If a content request can not be satisfied from locally available content, e.g., from the local cache coupled to the streamer node's on demand server, a request is sent from the streamer node to a remote cache for the requested content, e.g., program. The remote cache may be, e.g., part of a division cache located at a division cache node, a regional cache located at a regional VOD library or a national cache located at a national VOD library.

The requested content is streamed from the remote cache to the requesting node, e.g., the streaming node responding to a user request for content. Content is stored in the local cache associated with the streaming node which issued the request to the remote cache as it is received. The content may and normally does, in the case of a video program, include I, P and B frames which may be coded in accordance with, for example, the MPEG-2 Standard. Audio data corresponding to the frames is normally sent with each of the I, P and B frames. For purposes of discussion, reference may be made to I, P and B frames which refers to a frame according to how the image is coded. It is to be understood that the corresponding audio data may and normally is sent with each transmitted frame.

As content is received, the received frames are stored in the local cache and tracked, e.g., indexed according to their position from the start of the program to which they correspond. The indexing may be, and in some embodiments is, by frame number and/or time from the start of the program. Thus, receipt at a local node responsible for controlling local caching, of data corresponding to a requested program, initially causes a normal play file to be created as well as various trick play files to be created. These files are populated and updated with program data as it is received from the remote streaming node. The normal play file will ultimately include the full content of the program, e.g., each of the normal playback frames. The trick play files include the frames used to support the corresponding trick play operation to which the particular trick play file corresponds. Trick play files for different speeds of forward and reverse operation may, and normally are, created and then updated as program content is received.

Rather than wait for the full program to be received from the remote cache and stored, after receipt of a small amount of program data, e.g., several frames, a streaming node in accordance with one embodiment begins streaming the program to the customer premise device, e.g., set top box, corresponding to a customer from which a content request was received.

While content is being streamed from the streamer node to a customer premise device, if a trick play request is received at the streaming node, the streaming node first determines if the trick play command can be satisfied from the locally available content, e.g., trick play content already stored in the local cache. The VOD server at the streamer node may be responsible for making this determination. The streamer node will normally be able to satisfy, using data stored in the local cache, a reverse, skip back or pause trick play command without having to access content which has not already been received from the remote cache. While content corresponding to a reverse or other trick play command relating to content which has already been streamed to the customer premise device is being provided by streaming content from the local cache to the customer premise device, content can continue to be received from the remote cache. The normal and trick play files stored in the local cache are updated as data corresponding to the program continues to be received and stored in the local cache.

In the case of a fast forward or skip ahead trick play command, if the command results in an attempt to access content which has not already been stored in the local cache, the streamer node determines that it can not satisfy the trick play command based solely on the locally available content and requests the required trick play data from the remote cache which was supplying the program content being stored and streamed in response to the user request for content. The request for trick play data sent to the remote server may include, e.g., a frame number or time index indicating the point in the requested program from which the trick play data is to be provided. The request for trick play data may also include, for example, an indication of the trick play command and/or trick play file from which the trick play data is to be supplied. For example, the request to the remote server may indicate that trick play data is to be supplied for 2× playback and that the data is to begin from a particular frame number or time within the program.

In response to the request for trick play data, the remote server begins streaming data from a trick play file to the streamer node thereby providing the required trick play data to satisfy the command received from the user device. The received trick play data, e.g., I frames and P frames, are stored in trick play file corresponding to the trick play command, e.g., 2x fast forward trick play file, and are also used to update the other files corresponding to the program to which the trick play data relates. Thus, the normal playback file as well as other files maybe updated with the trick play data received from the fast forward trick play content supplied by the remote cache. The server node keeps track of the frames of the program which are received and stored in the cache. In some embodiments, the remote cache node also keeps track of the frames which it sends to the streamer node with respect to at least programs which have not been fully communicated to the streamer node and/or local cache used by the streamer node.

In cases where the data rate between the remote cache node and streamer node is higher than that required to support simply the streaming of the trick play content required to satisfy the received trick play command, the remote cache also sends data, e.g., frames, to be used to complete the set of normal play data being supplied to the streamer node and thus the local cache. In some embodiments, the streamer node specifies in one or more messages which are communicated to the remote cache which normal play frames are missing and should be supplied in addition to trick play data which is being supplied. In other embodiments, the remote cache determines, based on its knowledge of the frames already transmitted to the streamer node, what additional frames are required to complete the set of normal play data in the local cache. By tracking which frames have already been sent in the case where the remote cache does the tracking and which frames have already been received as is the case when the streamer node and/or local cache performs the tracking, transmission of redundant data is avoided.

The receipt of some frames that are not used for trick play, e.g., P frames, while trick play data is being received, i.e., during a period of time in which a trick play file is being streamed from the remote cache, may involve the use of a small amount of bandwidth beyond that required to support trick play, it allows for the transfer of the normal play data which can be available in the event that a user transitions from forward trick play to a reverse or normal playback state of operation, e.g., by issuing one or more additional commands.

The normal play data which may be sent as a supplement to trick play data is normally transmitted with unsent I frames being given priority over unsent P frames which are given priority over unsent B frames. The missing frames from the point at which the user entered trick play to the point being viewed are, in some embodiments, sent in order of this frame priority. In such an embodiment, if a user issues a reverse command, there is a good chance that the reverse trick play files will have been populated with I-frames and P-frames based on the fast-forward and normal play data which is received from the remote cache during trick play streaming even if all the B-frames corresponding to a program portion which was fast forwarded through have not been received.

When a user issues a normal playback command instructing the streamer to cease supplying trick play data and to return to supplying normal play data from the point in the program indicated in the normal playback command, the remote cache is instructed to stop supplying trick play data and to return to streaming normal playback data. The remote cache responds to such an instruction by returning to supplying normal playback data to the streamer node for storage in the local cache and streaming to the user. The remote cache omits from the supplied normal playback data frames which it is aware have already been sent to the streamer/local cache, e.g., as part of a trick play stream from the remote cache.

In some embodiments some normal play data is sent as trick play data so that the normal play data file can be completed in a timely fashion. However this is not mandatory.

Regardless of whether or not some normal play data is sent in addition to data intended to support a trick play mode of operation, tracking of frames are received from the remote cache as part of the trick play data stream allows the available bandwidth to be used efficiently with just the missing frames being sent to complete the normal playback program data. This is more efficient than simply starting to transmit the content of the normal playback file from the remote cache without regard to the fact that some of the frames in the normal playback data set were already transmitted as part of a trick play file streamed from the remote cache to the streamer node/local cache.

Numerous variations on the above described methods and apparatus are possible.

One particular exemplary method is directed to a method of operating a node, e.g., a streamer node, to provide video content representing a program before the program content is fully received by the streamer node and/or stored in a local cache accessible to the streamer node. The streamer node may be receiving the content from a remote cache while the method is implemented.

In the exemplary method, while receiving requested program content from the remote cache and streaming it to a customer premise device corresponding to a requesting user, the streamer node may receive a trick play command and, in response to the trick play command, determine if sufficient frame data has already been received from the remote cache to support a trick playback operation corresponding to the received trick play command. When it is determined that sufficient frame data is not available from the local cache, the method further comprises requesting trick play data from the remote cache corresponding to the trick play command and request trick play mode of operation. The exemplary method further comprises receiving at least some additional data, omitted from received trick play data, required to complete a set of normal playback data corresponding to said program while receiving trick play data from said remote cache.

Numerous additional benefits, features and embodiments of the methods and apparatus of the present invention are described in the detailed description which follows.

DETAILED DESCRIPTION

Figure 1:
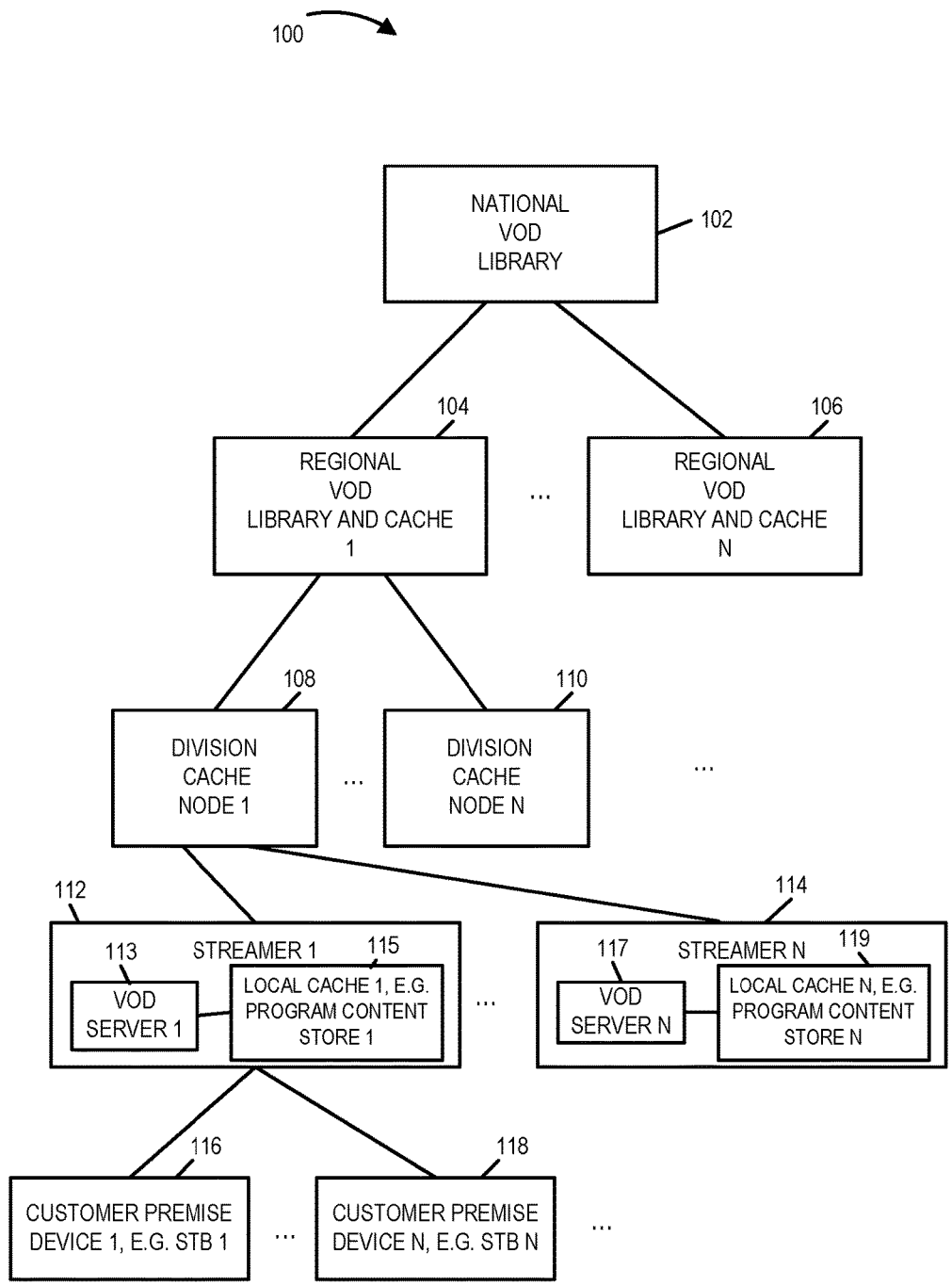
FIG. 1 is a drawing of an exemplary hierarchical video on demand system in accordance with an exemplary embodiment.

FIG. 1 is a drawing of an exemplary hierarchical video on demand (VOD) system 100 supporting caching and streaming in accordance with one exemplary embodiment. Exemplary system 100 includes a national VOD library 102 which is coupled to a plurality of regional VOD libraries and caches (regional VOD library and cache 1 104, . . . , regional VOD library and cache N 106). Each regional VOD library and cache is coupled to a plurality of division cache node. For example, regional VOD library and cache 104 is coupled to division cache nodes (division cache node 1 108, . . . , division cache node N 110). Each of the division cache nodes is coupled to a plurality of nodes 112, 114 which are responsible for streaming content to customer premise devices. For purposes of explaining the invention such nodes will be referred to as streamers. For example, division cache 1 108 is coupled to streamers (streamer 1 112, . . . , streamer N 114). The streamers (112, 114) are located, e.g., at a local cable head end office. Each streamer is responsible for providing content to one or more customer premise devices, e.g., set top boxes (STBs), televisions with built in tuners, video capable personal computers, etc. For example streamer 1 112 is coupled to customer premise devices 116, 118. Customer premise device 1 116 is, e.g., a set top box (STB 1) while customer premise device N 118 is another STB, i.e., STB N. Each streamer 112, 114 includes a VOD server (113, 117) and a local cache (115, 119). The VOD server 113, 117 is responsive to user content requests and commands and also serves to control communication with one or more of the remote caches and storage of video content received from the remote caches. The local cache 115, 119 is used to store program content, e.g., normal play and corresponding trick play files. Processing of normal play content received from a remote server to create trick play files and to track which frames of a program have been received may occur in the VOD server or the cache. In some implementations the local cache is implemented as a content store and includes processing logic, e.g., a CPU and control routine, responsible for performing various cache management, content storage, processing and retrieval functions as well as storage, e.g., one or more disk drives or other storage devices for storing program content.

Each of the streamers 112, 114 is responsible for responding to content requests, e.g., sent by users via the STB located at the customer premise where the user is located. The streamers 112, 114 are also responsible for streaming the requested content and responding to trick play commands from users via a customer premise device such as STBs 116, or 118. The streamers 112, 114 may be coupled to the customer premise devices via a cable or other network capable of supporting the communication of video and/or other content. Streamers 112, 114 are coupled to the remote caches 108, 110, 106, 104, 102 via a communications network over which content requests can be communicated to the remote caches and content can be received. While shown as a hierarchal configuration in FIG. 1, it should be appreciated that the streamer nodes 112, 114 can be directly coupled to one or more of the remote caches 102, 104, 106, 108, 110 via a high speed data network, e.g., a ring network. As will be discussed below, the caches store normal playback files and trick play files corresponding to a variety of programs. Normal playback files normally included a full set of I, P and B frames corresponding to a program as well as any corresponding audio content. Trick play files, depending on the playback speed they are intended to support normally include some subset of the frame data including in the normal playback file and, optionally, some corresponding audio content. The higher the trick playback speed the lower the number of frames which are to be displayed for a given portion of a program. Accordingly, high speed trick play files normally include I frames but not P or B frames. This is because I frames can be decoded without using data from another frame. P and B frames use inter-frame coding and rely on data from another frame for coding and thus decoding. While low rate trick playback files, e.g., files corresponding to 2× speeds may include the full set of I-frames, they may also include data corresponding to P-frames as well. Because decoding of B-frames normally requires data corresponding to two other frames, B-frames are often not included in sets of trick play data since omission of data corresponding to one of the multiple frames upon which a B-frame is based, may result in improper decoding or preclude decoding of a B-frame altogether.

Figure 2A:
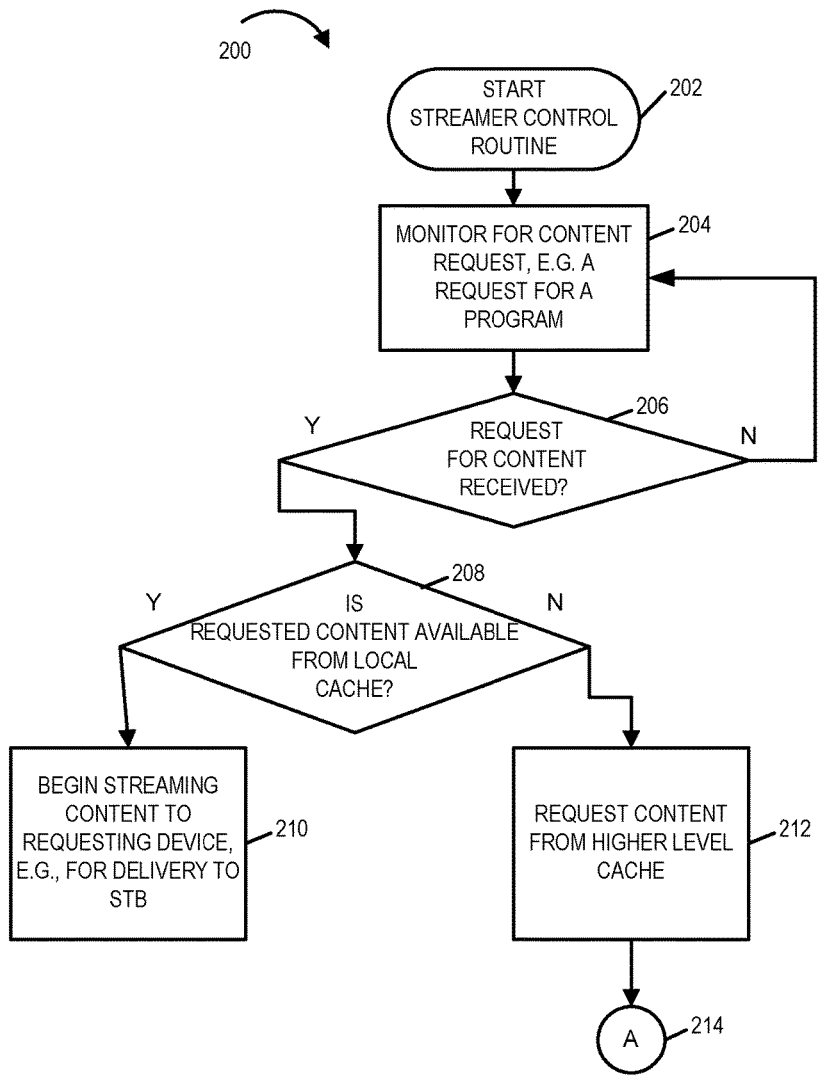
FIG. 2, which comprises the combination of FIG. 2A, FIG. 2B, FIG. 2C, FIG. 2D and FIG. 2E, is a flowchart of a video streaming and content caching method implemented in accordance with one exemplary method.
Figure 2:
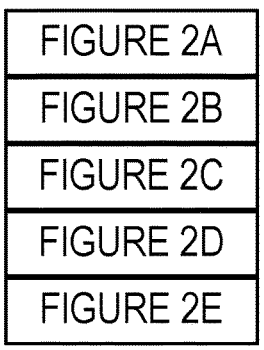
Figure 2B:
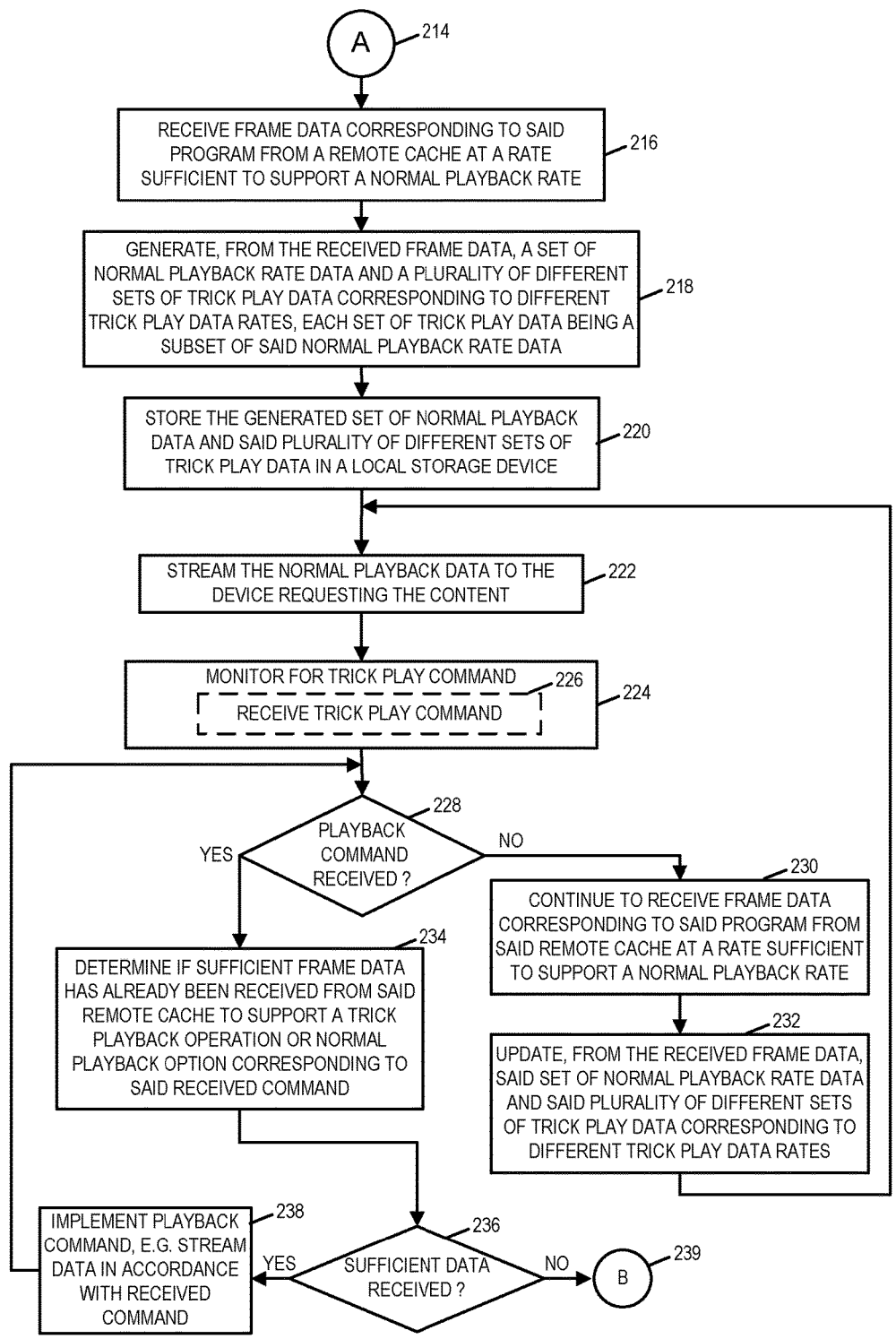
Figure 2D:
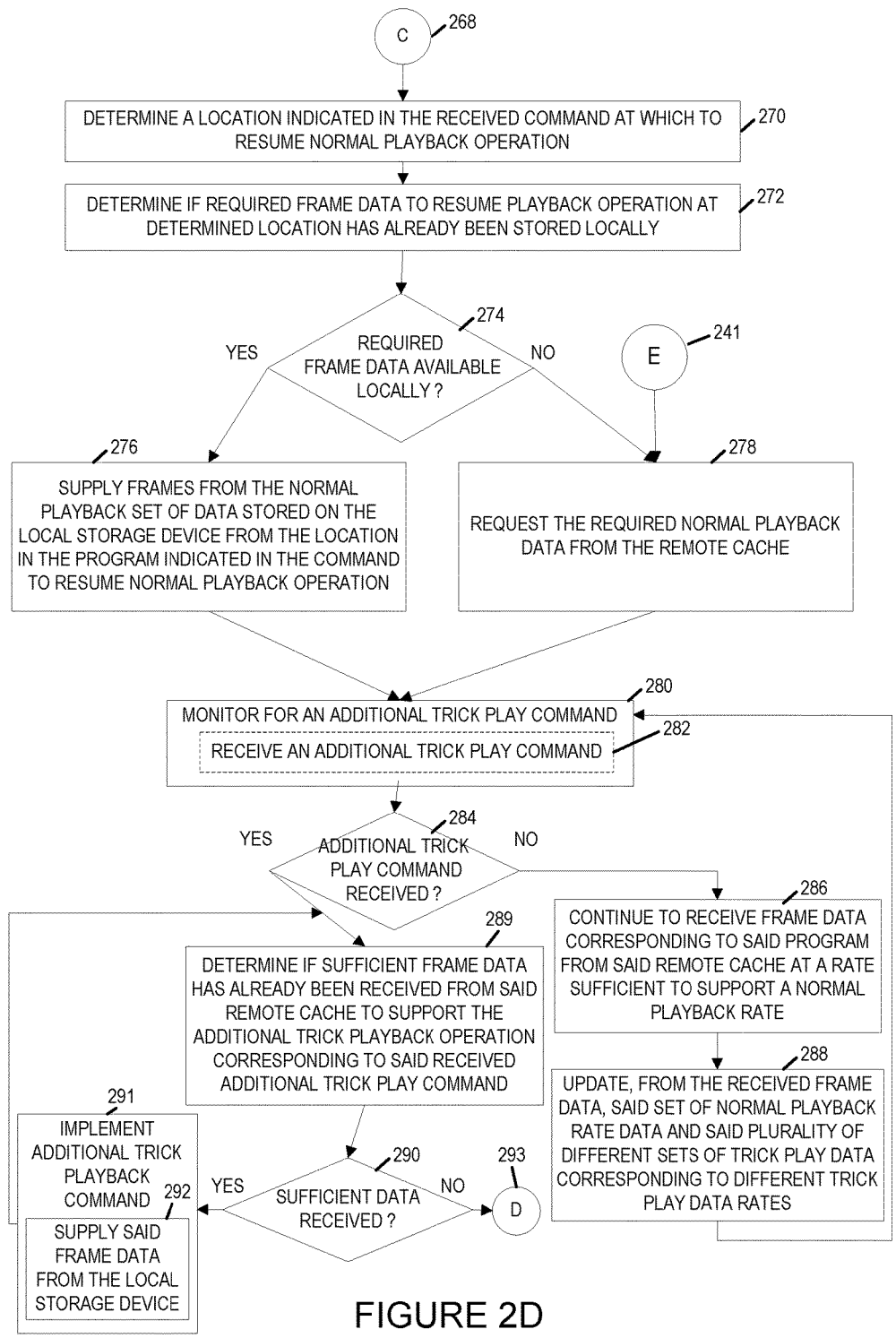
Figure 2E:
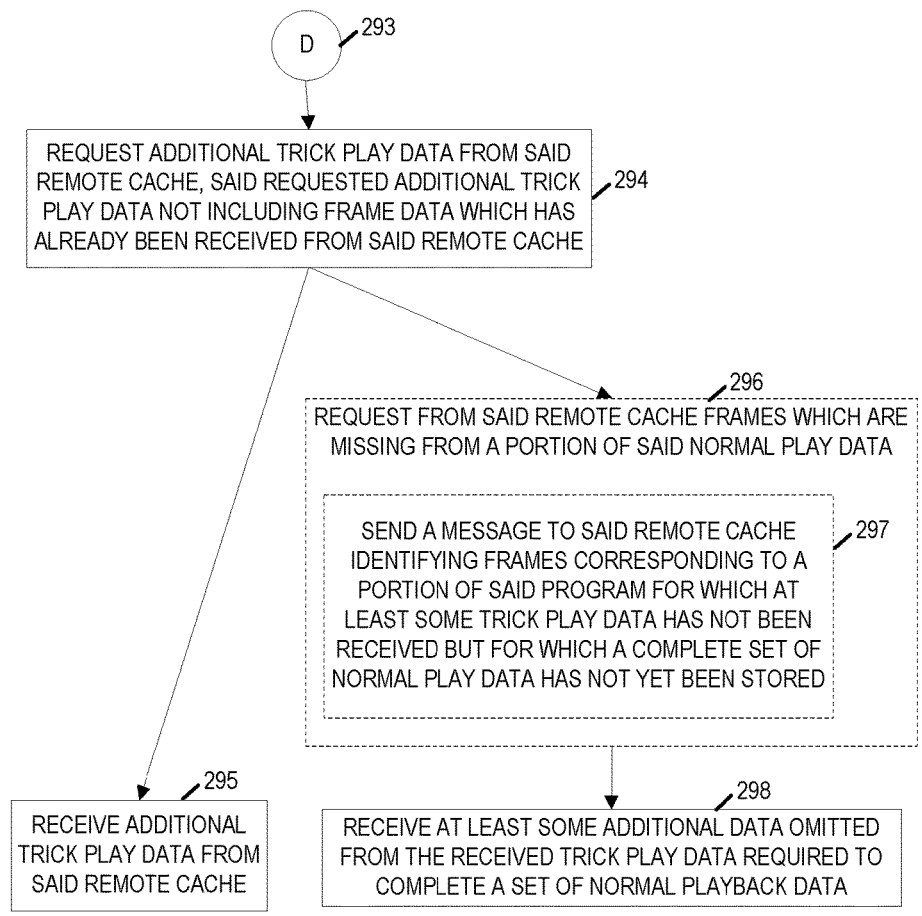

FIG. 2, which comprises the combination of FIG. 2A, FIG. 2B, FIG. 2C, FIG. 2D and FIG. 2E, is a flowchart 200 of an exemplary method of operating a streamer, e.g., streamer 112, 114 in accordance with one exemplary embodiment. The exemplary method of flowchart 200 is performed by a streamer node, e.g., a node including a server and a local cache. The local cache is, e.g., a storage device such as a memory for storing content, e.g., audio and/or video programs. The exemplary method of flowchart 200 is, e.g., a method of operating a node to provide video content representing a program in response to a content request, e.g., selection of an on demand program by a user of STB 116, which is being supplied by a remote cache. In some embodiments, requested program content is video which includes I frames, P frames and B frames. The frames may be time indexed from the start of the program and/or indexed according to frame number from the start of the program.

The exemplary method starts in step 202 where the node implementing the method is powered on and initialized. Operation proceeds from step 202 to step 204, in which the node monitors for a content request, e.g., a request for a program, from one of the customer premise devices to which the node is coupled. Operation proceeds from step 204 to step 206. In step 206 if a request for content was not received, then operation proceeds from step 206 to step 204 for additional monitoring. However, if a request for content was received in the monitoring of step 204, then operation proceeds from step 206 to step 208. In step 208 a check is made to determine if the requested content is available from the nodes local cache, e.g., cache 115. If the request content is available from the local cache 115, then operation proceeds from step 208 to step 210, in which content is retrieved from the local cache 115 and streamed to the requesting device, e.g., set top box (STB), for decoding and display on a TV coupled to the STB allowing viewing by the requesting user. However, if the requested content is not available from the local cache 115 then operation proceeds from step 208 to step 212.

In step 212 a request for the content is sent from the streamer node 112 to a higher level cache, e.g., one of caches 102, 104, 106, 108, 110, known to have the requested content. The VOD server 113 in the streamer 112, maybe responsible for issuing the request to the remote cache. Operation proceeds from step 212 via connecting node A 214 to step 216. In step 216 the frame data corresponding to said program is received at the streamer 112 from a remote cache at a rate sufficient to support a normal playback rate. Operation proceeds from step 216 to step 218.

In step 218 the streamer, e.g., the VOD server 113 or processing circuitry in the local cache 115 generates, from the received frame data, a set of normal playback rate data and a plurality of different sets of trick play data corresponding to different trick play data rates, each set of trick play data being a subset of said normal playback rate data. Operation proceeds from step 218 to step 220. In step 220 the generated set of normal playback data and said plurality of different sets of trick play data in stored in a local storage device, e.g., the local cache 115.

Operation proceeds from step 220 to step 222. In step 222 normal playback data is streamed, e.g., from the VOD server 113, to the device requesting the content. Operation proceeds from step 222 to step 224. In step 224 the VOD server 113 monitors for a trick play command. The VOD server 113 may receive a trick play command while performing monitoring step 224. Thus step 224 may, and sometimes does, include step 226, in which the VOD server 113 receives a trick play command from the customer premise device, e.g., in response to a user entering a fast forward, reverse or other command via a remote control. In some such embodiments, the received trick play command is received in a message, e.g., a trick play message, from a set top box. The message may, and in some embodiments does include, information indicating a trick play speed and direction of playback being requested and information indicating the point in the program being supplied from which the command is to begin being implemented. The position information may indicate a frame location in the program, e.g., as indicated by a frame number or a time from the start of the program, from which the command is to be implemented. The indicated frame may be the current frame being viewed at the time the trick play command was received. Thus, in various embodiments, the frame location is indicated by a frame number included in the message. Operation proceeds from step 224 to step 228.

In decision step 228 the cache node is controlled to proceed differently as a function of whether or not a trick play command has been received. The playback command may be a trick play command such as a fast forward, reverse or skip forward or back command. Alternatively it could be a normal playback command, e.g., a command to resume normal playback following a trick playback mode of operation triggered by an earlier trick play command. If a command was not received in the monitoring step 224, then operation proceeds from step 228 to step 230. In step 230 streamer node 112, and thus the VOD server and local cache 113, 115, continue to receive frame data corresponding to said program from said remote cache at a rate sufficient to support a normal playback rate. Operation proceeds from step 230 to step 232. In step 232 the local cache data corresponding to the program being streamed is updated using the frame data received from the remote cache. The updating includes updating said set of normal playback rate data and said plurality of different sets of trick play data corresponding to different trick play data rates using the normal playback frames, e.g., I, P, and B frames received from the remote cache. Operation proceeds from step 232 back to step 222. Thus in the absence of a trick play or other command being received, the program will continue to be streamed at a normal playback rate to the user device while normal playback data is also being received from the remote cache. The normal playback and trick play files are updated, e.g., populated with the frames received from the remote cache, based on the received normal playback data. This will continue, e.g., until the program is completely stored in the local cache or a command is received from the customer premise device to which the program is being streamed by the streamer node 112. Streaming of content to the customer premise device will continue to the end of the program even though the full program may be received from the remote cache and stored in the local cache 115 before the program is fully streamed to the customer premise device, e.g., STB.

Returning to step 228, if a command, e.g., a trick play or normal playback command, was received in the monitoring performed during step 224, then operation proceeds from step 228 to step 234. In step 234 the cache node determines if sufficient frame data has already been received from said remote cache to support a playback operation corresponding to said received command. For example, if the command is a rewind command and normal playback data was received up until the point in the program where the command was received, sufficient frame data will have been received from the remote cache to support the rewind (reverse) trick play operation which is requested. However, if the command is a forward or skip command, or a rewind command through a portion of a program which was fast forwarded through or skipped without the full set of data for the program portion having been received from the remote cache, sufficient frame data may not be available to implement the requested trick play command. Determination of whether or not sufficient frame data has already been received to support the trick play command is made in some cases, by accessing the local trick play file corresponding to the requested trick playback speed and direction of operation.

Operation proceeds from step 234 to step 236 where the processing flow is determined based on the determination made in step 234. In step 236 the cache node is controlled to proceed differently depending upon whether or not sufficient data has been received to support the received playback command. If the determination of step 234 is that sufficient frame data has already been received, then operation proceeds from step 236 to step 238. In step 238 the streamer 112 implements the playback command, e.g., the VOD server 113 streams data, e.g., normal or trick play data from the program point indicated in the received command, from the local 115 cache in accordance with the received playback command. The data may be streamed from the normal playback or trick playback file stored in the local cache corresponding to the playback direction and speed indicated in the received command. Operation proceeds from step 238 back to step 228.

Returning to step 236, if step 234 has determined that there is insufficient received frame data to support the received playback command, e.g., enough data from the remote cache has not already been stored in the local cache 115 to support the command, then operation proceeds from step 236 via connecting node B 239 to step 240.

In step 240, a check is made to determine if the received command was a normal playback command or a trick playback command. If the received command was a normal playback command operation proceeds to step 278 via connecting node E 241. Step 278 will be discussed further below. If in step 240 it is determined that the received command was a trick playback command, operation proceeds to step 242.

In step 242 the streamer, e.g., the VOD server 113 in the streamer 112, requests the required trick play data from the remote cache which has been supplying the program content. The request includes the point in the program from which the trick play data is to begin being provided, as well as the rate and direction of trick play operation for which the data is being sought thereby allowing the remote cache to determine which of the trick play files corresponding to the program being streamed should be accessed and at what point within the file to begin streaming from. The request to the remote cache may include a program identifier and a frame or time index used to communicate the relevant point in the program from which the trick play data should begin being streamed. Operation proceeds from step 242 to step 244.

In step 244, the requested trick play data is received, e.g., by the streamer node 112 and VOD server included therein, from the remote cache. In some embodiments, the received trick play data includes I-frames but does not include P-frames or B-frames. In other cases, depending on the trick play speed, the trick play data may include I and P frames. Normally, because of the complexity of decoding B-frames, B-frame data is not included in the trick play data. Operation proceeds from step 244 to step 256.

In some embodiments, in addition to streaming trick play data, the remote cache also streams some normal play data not included in the trick play data stream. The additional data may be requested by the streamer node 112 or automatically sent by the remote cache in addition to the requested trick play data stream. The data rate used to communicate data from the remote cache to the streamer node 112 may be a little higher than would be required if only the trick play data were streamed but not immensely higher, e.g., two or more times higher. For example, during 4× trick play speed the data rate between the remote cache and the local cache can be kept less than the data rate which would be required to support streaming of the normal data at 4× the data rate required to support normal playback operation. In some embodiments, the data rate between the remote cache and the streamer node 112 is less than twice the data rate used to support normal playback of the program being streamed.

The supply of some normal play data during a period of time during which trick play data is being streamed from the remote cache, facilitates updating and completion of the normal play data file in the local cache 115 much sooner than would be accomplished if normal playback data was supplied simply during normal playback operation. Thus, in some embodiments while trick play data corresponding to a program is being streamed from the remote cache to the streamer 112, at least some normal play data corresponding to the program is also streamed to facilitate completion of the normal playback data file stored on the local cache 115.

In embodiments where at least some normal play data is streamed from the remote cache during a period of time in which trick play data is being streamed in response to a request for trick play data, operation proceeds from step 242 to one of step 246 and step 250. These steps are omitted in embodiments where at least some normal playback data is not streamed in conjunction with trick play data corresponding to a program.

In step 246 the streamer node requests, from said remote cache, specific frames which are missing from a portion of said normal play data. The requested frames may be identified in a request message by providing specific frame numbers or program times, e.g., presentation time stamps. Thus, in some embodiments, step 246 includes step 248 in which the cache node sends a message to said remote cache identifying particular frames corresponding to a portion of said program for which at least some trick play data has been received but for which a complete set of normal play data has not yet been stored. The frame information allows the remote cache to identify and supply missing frames to be used in completing the set of normal playback data being stored on the local cache 115. In some embodiments, missing I-frames are requested prior to requesting missing P-frames. In some embodiments, missing P-frames are requested prior to requesting missing B-frames. In this way, the higher priority portions, e.g., I and P frames, of the normal playback file will be received and stored prior to lower priority frames. Significantly, as the normal playback data is received multiple trick play files may also be updated. The receipt of I and then P frames allows the trick play files for various speeds to be completed before the normal playback data is completed. In various embodiments, supplemental normal play frame data is not supplied during trick play for portions of the program which have not yet been accessed by the user as part of a trick play operation. That is, completion of the normal playback file and trick play files corresponding to a portion of a program a user has fast forwarded through will be given priority over normal play data for portions of the program, e.g., the end of a program, the user has not yet fast forwarded through. Of course upon catching up with the point through which a program has been accessed by a user, the remote cache may send the remainder of the program data to complete the program file on the local cache 115.

Operation proceeds from step 246 to step 250. In step 250 the streamer 112 receives at least some additional data omitted from the received trick play data required to complete a set of normal playback data corresponding to said program. Step 250, in some embodiments, includes step 252 in which the streamer 112 receives from said remote cache frames which are missing from a portion of said normal play data set for which at least some frames have already been stored. In some embodiments, step 252 may, and sometimes does, include step 254 in which the cache node receives missing I frames corresponding to a portion of said program for which trick play data has been received but not a full set of normal play data, while receiving additional trick play data corresponding to another portion of said program.

In some such embodiments, the missing I-frames are received prior to receiving missing P-frames. In some such embodiments, missing P-frames are received prior to receiving missing B-frames. Operation proceeds from step 250 to step 256.

In some embodiments, steps 244 and 250 are performed in parallel. In some embodiments, there is at least some overlap in time between the execution of steps 244 and 250. In some embodiments, steps 244 and 250 are performed during the same time period. Thus, in some embodiments, while receiving trick play data from said remote cache, the cache node also receives at least some additional data, omitted from the received trick play data, required to complete a set of normal playback data corresponding to said program.

In some embodiments, during at least some times, the additional data required to complete the set of normal playback data corresponding to the program is received when trick play data is being received at a rate lower than or equal to a rate sufficient to support a normal playback rate, e.g., presentation of the program at a normal display rate. In some embodiments, the normal playback data used to supplement the trick play data is received from the remote cache at a rate lower than or equal to the rate at which normal playback data is streamed from the remote cache to the streamer 112. This rate may be faster than the normal playback data rate but need not be increased when streaming from a trick playback file. Thus, in some embodiments, when trick playback data is being transferred from the remote cache to the local cache, the data transfer rate between the remote and local caches remains the same as when normal playback data alone is being supplied. Since data need not be sent multiple times, the time required to complete a program transfer from the remote to the local cache remains the same or relatively constant despite the transfer of trick play data from the remote cache in response to a trick play command received by the VOD server. This is because the trick play support affects the order in which frames are communicated but does not, in accordance with the invention, require the same frames to be sent multiple times, e.g., as part of a normal or trick play data transfer.

In some embodiments, while receiving trick play data in step 244 from said remote cache, at a rate lower than a rate sufficient to support a normal playback rate, the cache node also receives in step 252 from said remote cache frames which are missing from a portion of said normal play data set for which at least some frames have already been stored. For example, in step 252 the cache node receives missing P or B frames corresponding to a portion of the program for which at least some I frames are stored.

In step 256 the streamer 112, e.g., the VOD server 113 and/or local cache 115, keeps track of the frames included in the received trick play data and normal play data. Step 256 includes step 258 in which the streamer 112, e.g., VOD server and/or local cache 115, keeps a list of received frames, e.g., frames stored in the local cache 115. Operation proceeds from step 256 to step 260. In step 260, in response to receiving trick play data, the plurality of different sets of trick play data and said set of normal playback rate data stored in the local cache 115 are updated with trick play data received from said remote cache. Operation proceeds from said 260 to step 262.

In step 262 the streamer 112 monitors for a command to resume normal playback operation. Step 262 may, and sometimes does, include step 264 in which a command to resume normal playback operation is received, e.g., by the VOD server 112. Operation proceeds from step 264 to step 266.

In step 266 the streamer 112, e.g., VOD server 113 in the streamer 112, determines how to proceed depending upon whether or not a command to resume normal playback operation has been received. If a command to resume normal playback operation has not been received, e.g., from the customer premise device to which the program was being streamed, operation proceeds from step 266 back to step 262 for additional monitoring. However, if a command instructing or requesting that normal playback operation be resumed, then operation proceeds from step 266 via connecting node C 268 to step 270.

In step 270 the streamer 112 determines a location in the program indicated in the received command at which to resume normal playback operation. Then, in step 272 a determination is made if required frame data to resume playback operation at the determined location has already been stored locally, e.g., in the local cache 115. Operation proceeds from step 272 to step 274.

In step 274, if the required frame data is available locally, then operation proceeds from step 274 to step 276. However, if the required frame data is not available locally, then operation proceeds from step 274 to step 278.

In step 276 the streamer 112, e.g., the VOD server 113 of the streamer 112, supplies frames from the normal playback set of data stored on the local cache 115, e.g., from the location indicated in the program indicated in the command to resume normal playback operation. Operation proceeds from step 276 to step 280.

Returning to step 278, in step 278 the streamer 112 requests the required normal playback data required to support normal playback operation from the remote cache. Operation proceeds from step 278 to step 280.

In step 280 the streamer 112, e.g., VOD server 113 included in the streamer 112, monitors for an additional trick play command. Step 280 may, and sometimes does, include step 282, in which an additional trick play command is received. Operation proceeds from step 280 to step 284.

In step 284 operation proceeds differently depending upon whether or not the streamer 112 has received an additional trick play command in the monitoring of step 280. If an additional trick play command has not been received, then operation proceeds from step 284 to step 286, in which the streamer 112 continues to receive frame data corresponding to the program from the remote cache at a rate sufficient to support a normal playback rate. Operation proceeds from step 286 to step 288, in which the streamer 112 updates, from the received frame data, the set of normal playback data and said plurality of different sets of trick play data corresponding to different trick play data rates. Operation proceeds from step 288 to step 280 for additional monitoring for an additional trick play command.

Returning to step 284, if an additional trick play command was detected in the monitoring of step 280, then operation proceeds from step 284 to step 289. In step 289 the cache node determines if sufficient frame data has already been received from said remote cache to support the additional trick play operation corresponding to said received additional trick play command. Operation proceeds from step 289 to step 290. In step 290 the cache node is controlled to proceed differently depending upon the determination of step 290. If it was determined in step 289 that there is sufficient received data, then operation proceeds from step 290 to step 291 in which the streamer 112 implements the additional trick play command, i.e., streams data to the customer premise device in accordance with the command. Step 291 includes step 292 in which the streamer 112 supplies said frame data to support the additional trick playback operation from the local cache 115. Operation proceeds from step 291 to step 289.

Returning to step 290, if the determination of step 289 is that there is not sufficient frame data already received to support the additional trick playback operation, then operation proceeds from step 290 via connecting node D 293 to step 294. In step 294 the cache node requests additional trick play data from said remote cache, said requested additional trick play data not including frame data which has already been received from said remote cache. That is, frames which have already been received may be omitted from each set of trick play data which is communicated. Operation proceeds from step 294 to step 295 and one of step 296 and 298. In some embodiments operation proceeds from step 294 to step 298. In other embodiments, operation may, and sometimes does, proceed from step 294 to step 296.

Returning to step 295, in step 295 the streamer node receives additional trick play data from said remote cache. The received trick play data does not include previously received frames. Thus, for example if I frames corresponding to 4× fast forward playback speed were previously received and the user is now requesting 2× fast forward for the same portion of the program, half the frames may be supplied for 2× playback since the other half of the 2× trick play file frames was already supplied as part of the 4× playback data stream supplied by the remote cache.

Returning to step 296, in step 296 the streamer 112 requests from said remote cache frames which are missing from a portion of said normal play data. Step 296 may, and sometimes does, include step 297 in which the streamer 112 sends a message to said remote cache identifying frames corresponding to a portion of said program for which at least some trick play data has not been received but for which a complete set of normal play data has not yet been stored. Operation proceeds from step 296 to step 298, in which the cache node receives at least some additional data omitted from the received trick play data required to complete a set of normal playback data.

It should be appreciated that the above described methods allow program content, e.g., frames, to be supplied by a remote cache, stored in a local cache, and supplied to a device used to present the program to a user without the user having to wait for the full program to be supplied from the remote cache to the local cache before playback can begin. In addition trick play commands can be supported even though the full program has not been transferred from the remote cache to the local cache. While trick play file data may be sent from the remote cache to the VOD sever and/or local cache to support VOD requests by a user, content sent from the remote cache to support trick playback operations is tracked and the frames communicated as part of the trick play content stream sent from the remote cache are not resent from the remote cache when the VOD sever resumes normal playback operation and/or resumes the transfer of normal playback data to the VOD server and/or local cache servicing a customer's on-demand content request.

In the above described manner, program content can be streamed from a local VOD server before the local VOD sever has access to a complete local copy of the program but the early streaming and trick play support does not add significantly to the overall demand for bandwidth between the remote cache and local VOD sever and/or local cache. Furthermore the for a given supported data rate the amount of time required to transfer the complete program from the remote cache to the local cache of the VOD server remains relatively predictable and is unaffected or little affected by trick play requests.

Figure 3:
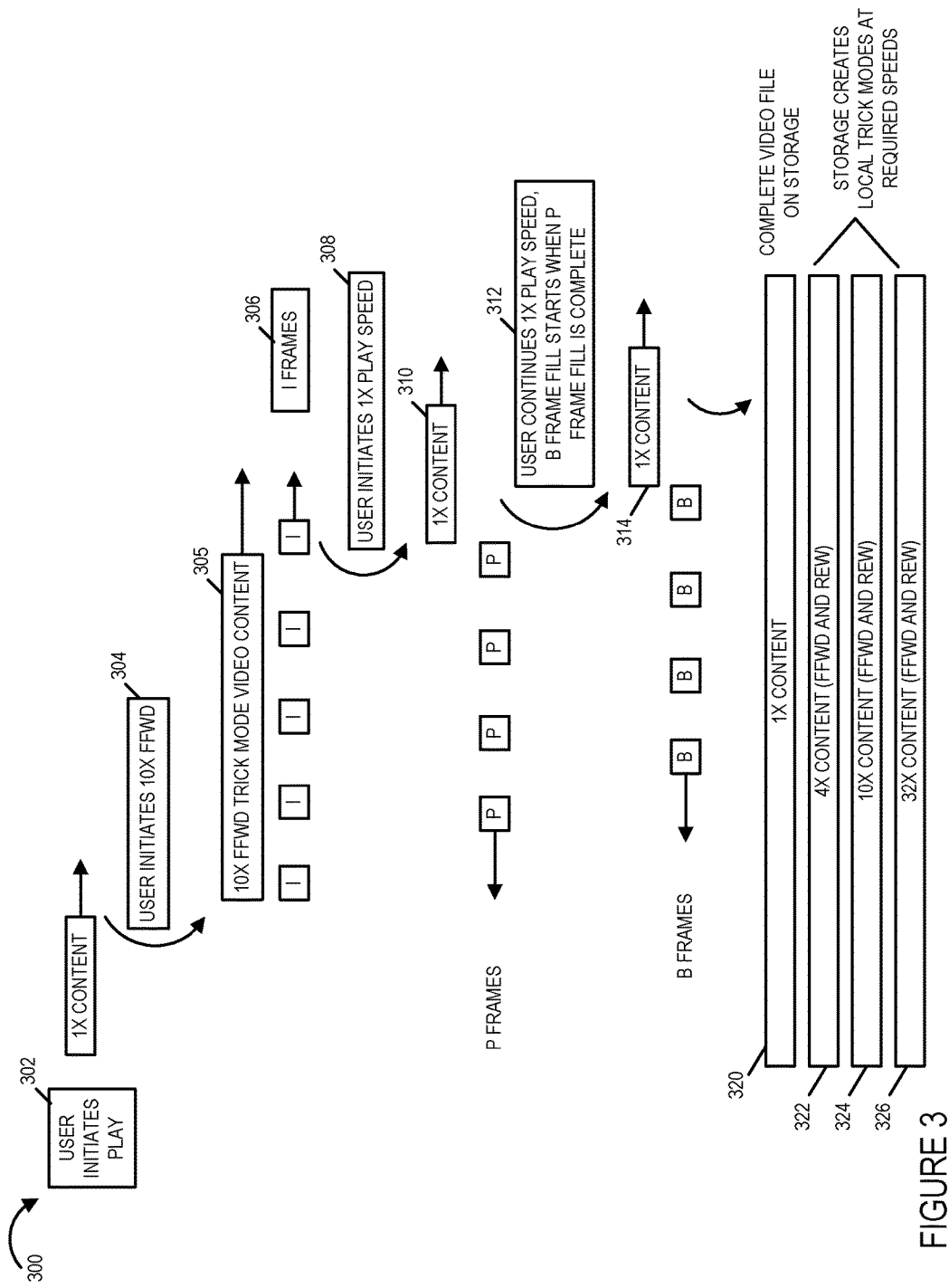
FIG. 3 is a drawing showing the receipt and storage of frames in accordance with one embodiment as a user switches between different modes of normal and trick play operation.

FIG. 3 illustrates an example 300 where a user first initiates content delivery at normal playback speed. In step 302 a user sends a command via a STB to the video on demand sever initiating normal playback of a program. The remote cache sends the streamer 112 normal play content, e.g., 1× content, for storage and delivery. In step 304, the user initiates a 10× fast forward command. The streamer 112 requests the 10×FFWD trick mode video content from the remote cache. The I frames 306 representing the 10× fast forward trick play data stream are stored in the local cache 115 and also sent to the STB corresponding to the user. The user than initiates 1X playback in steps 308. In response, the streamer requests normal playback data from the remote cache and begins streaming it to the user. While normal playback data is received and streamed, I frame and/or P frame data corresponding to previously received frames is also obtained from the remote cache. After missing I and P frame data is received, at step 312, B frame data which is missing is requested and begins being received by the streamer 112. As 1× data continues to be received from the remote cache and streamed to the STB, the missing normal play data is received and used to complete the normal and trick play files being created and stored on the local cache 115.

For example, a 1× content file is created and populated with the full set of frames corresponding to the requested program being delivered, a 4×FFWD and REW trick play file 322, a 10×FFWD and REW trick play file 324 and a 32×FFWD and REW file 326 are created.

Figure 4A:
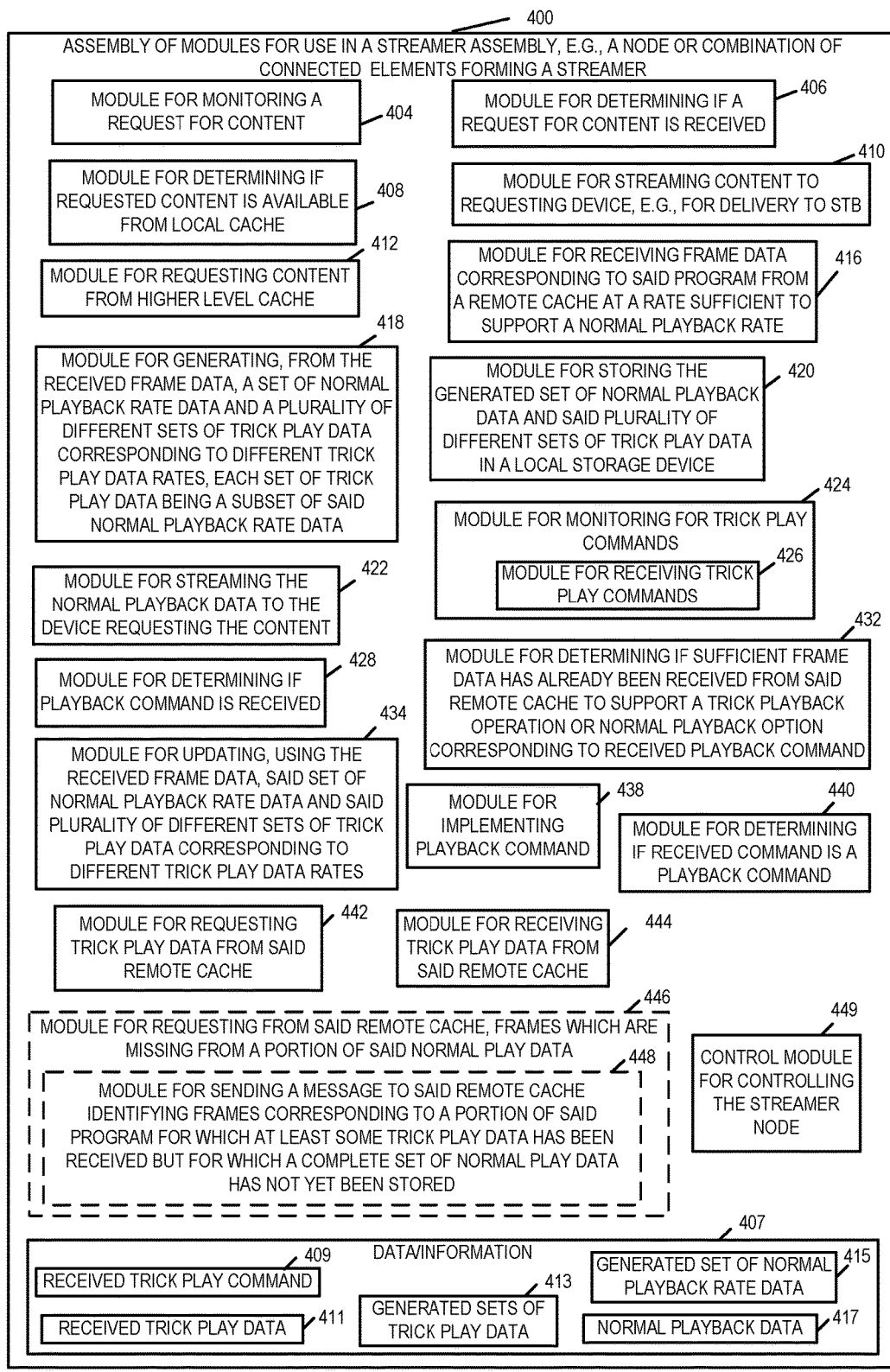
FIG. 4, which comprises the combination of FIGS. 4A and 4B, illustrates an assembly of modules, e.g., modules of a node or a network content distribution center, which can be used as an exemplary streamer.
Figure 4B:
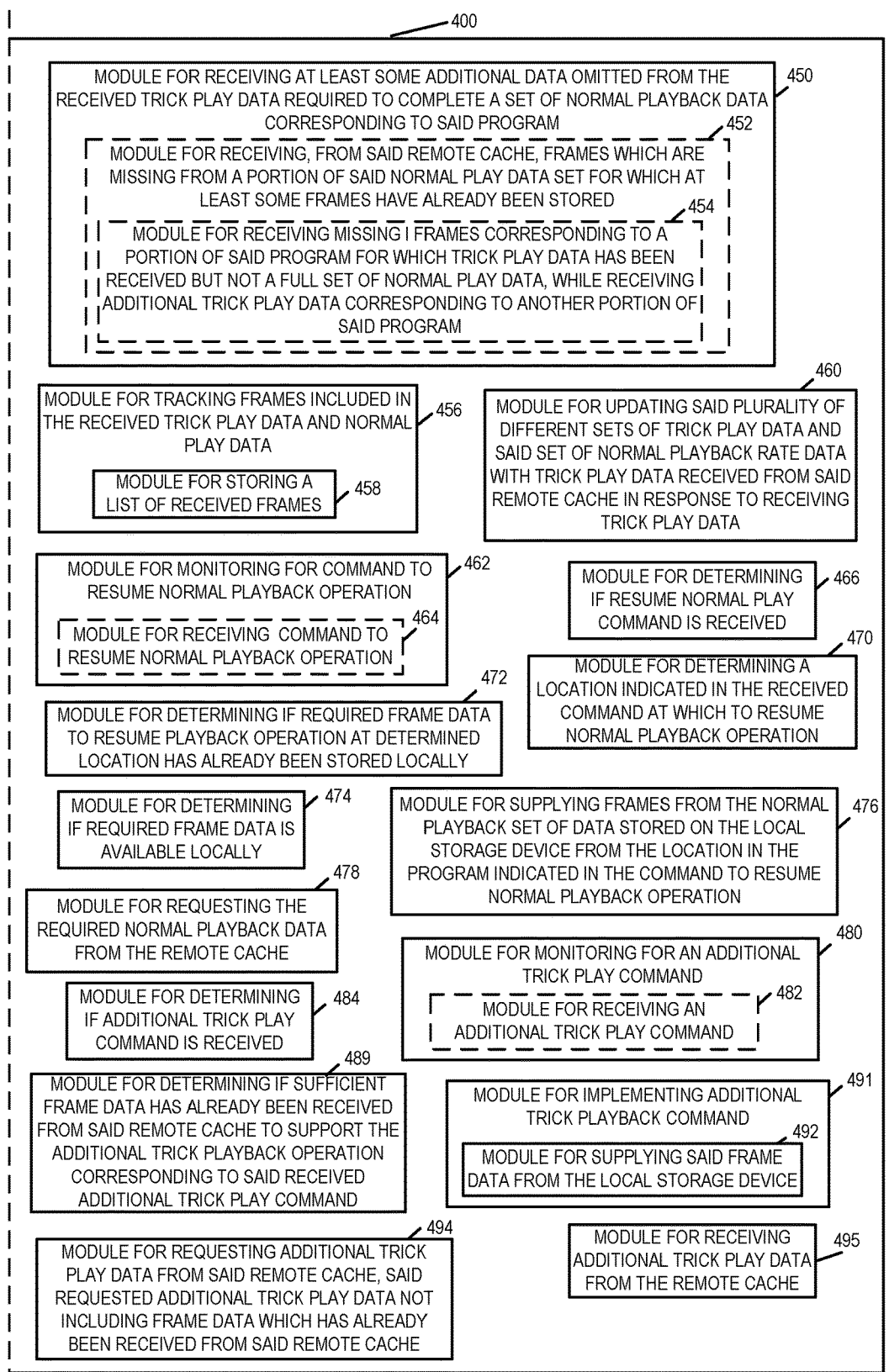

FIG. 4 represents the combination of FIGS. 4A and 4B with FIG. 4A representing the left side of FIG. 4 and FIG. 4B representing the right side of FIG. 4. FIG. 4 illustrates an assembly of modules 400 which can, and in some embodiments are, used in, or used as, a streamer such as the streamers 112, 114 illustrated in FIG. 1. The assembly of modules may be implemented in a single device or apparatus or implemented in a group of connected devices located at a content distribution point, e.g., cable network headend or office. The elements shown in FIG. 4 normally work together as a single node or site in a content distribution network. The modules in the assembly 400 can be implemented in hardware within a processor or multiple processors, e.g., as individual circuits. Alternatively, the modules may be implemented in software and stored in memory. Thus, in some embodiments a streamer includes memory storing modules shown in FIG. 4, a processor and memory coupled to a processor. The node may also include one or more interfaces for receiving and sending data, messages and/or other information. The modules shown in FIG. 4 may be included in a single device or distributed between a VOD sever and local cache which are interconnected and which each include a processor, memory and interface for communicating data, messages and content.

When implemented in software the modules include code, which when executed by a processor included in the streamer node, configure the processor to implement the function corresponding to the module.

Completely hardware based or completely software based modules may be used. However, it should be appreciated that any combination of software and hardware, e.g., circuit implemented modules may be used to implement the functions. As should be appreciated, the modules illustrated in FIG. 4 control and/or configure the streamer node 112 or elements therein such as a processor, to perform the functions of the corresponding steps illustrated in the method flowchart 200 of FIG. 2.

The assembly of modules 400 includes a module corresponding to each step of the method shown in FIG. 2. In some embodiments the modules shown in FIG. 4 perform and/or control the processor(s) included in the streamer node 112, 114 to perform a corresponding step, e.g., a step shown and/or described with respect to FIG. 2. For example module 404 corresponds to step 204 and is responsible for performing the operation described with regard to step 204.

As illustrated in FIG. 4, the assembly of modules 400 includes a module 404 for monitoring for a content request, e.g., a request for a program, from one of the customer premise devices to which the node is coupled, a module 406 for determining if a request for content was received, a module 408 for determining if the requested content is available from the nodes local cache, e.g., cache 115, a module 410 for streaming content to the requesting device, e.g., set top box (STB), a module 410 for requesting the content from a higher level cache, e.g., one of caches 102, 104, 106, 108, 110, known to have the requested content. The assembly of modules further includes a module 416 for receiving frame data corresponding to said program from a remote cache at a rate sufficient to support a normal playback rate, a module 418 for generating, from the received frame data, a set of normal playback rate data and a plurality of different sets of trick play data corresponding to different trick play data rates, each set of trick play data being a subset of said normal playback rate data, a module 420 for storing the generated set of normal playback data and said plurality of different sets of trick play data in stored in a local storage device, e.g., the local cache 115, a module 422 for streaming the normal playback data, e.g., from the VOD server 113, to the device requesting the content, a module 424 for monitoring for a trick play command, a module 426 for receiving the trick play commands, and a module 428 for determining if a playback command is received.

The assembly of modules 400 further includes a module 432 for determining if sufficient frame data has already been received from said remote cache to support a playback operation corresponding to received playback command, a module 434 for updating the set of normal playback rate data and said plurality of different sets of trick play data corresponding to different trick play data rates using the received frame data, a module 438 for implementing playback command, a module 440 for determining if a received command is a playback command, a module 442 for requesting trick play data from the remote cache, a module 444 for receiving trick play data from the remote cache, an optional module 446 for requesting from said remote cache, frames which are missing from a portion of said normal data, an optional module 448 for sending a message to said remote cache identifying particular frames corresponding to a portion of said program for which at least some trick play data has been received but for which a complete set of normal play data has not yet been stored, a module 450 for receiving at least some additional data omitted from the received trick play data required to complete a set of normal playback data corresponding to said program, a module 452 for receiving from said remote cache frames which are missing from a portion of said normal play data set for which at least some frames have already been stored, and a module 454 receiving missing I frames corresponding to a portion of said program for which trick play data has been received but not a full set of normal play data, while receiving additional trick play data corresponding to another portion of said program.

In some embodiments the assembly of modules further includes a module 456 for keeping a track of frames included in the received trick play data and normal play data, a module 458 for storing a list of received frames, a module 460 for updating the plurality of different sets of trick play data and said set of normal playback rate data stored in the local cache 115 with trick play data received from said remote cache, in response to receiving trick play data, a module 462 for monitoring for a command to resume normal playback operation which in some embodiments includes a module 464 for receiving a command to resume normal playback operation, a module 466 for determining if the resume normal play command is received, a module 470 for determining a location in the program indicated in the received command at which to resume normal playback operation, a module 472 for determining if required frame data to resume playback operation at the determined location has already been stored locally, a module 474 for determining if required frame data is available locally, a module 476 for supplying frames from the normal playback set of data stored on the local cache 115 from the location indicated in the program indicated in the command to resume normal playback operation.

The assembly of modules 400 in some embodiments further includes a module 478 for requesting the required normal playback data required to support normal playback operation from the remote cache, a module 480 for monitoring for an additional trick play command which in some embodiments includes a module 482 for receiving additional trick play commands, a module 484 for determining if additional trick play command is received, a module 489 for determining if sufficient frame data has already been received from said remote cache to support the additional trick play operation corresponding to the received additional trick play command, a module 491 for implementing the additional trick play command, a module 492 for supplying the frame data to support the additional trick playback operation from the local cache, a module 494 for requesting additional trick play data from said remote cache, said requested additional trick play data not including frame data which has already been received from said remote cache, and a module 495 for receiving additional trick play data from the remote cache.

The assembly of modules 400 further includes data/information 407 including stored sets of data. Data/information 407 includes received trick play command 409, received trick play data 411, generated sets of trick play data 413, generated set of normal playback rate data 415, and normal playback data 417.

Figure 5:
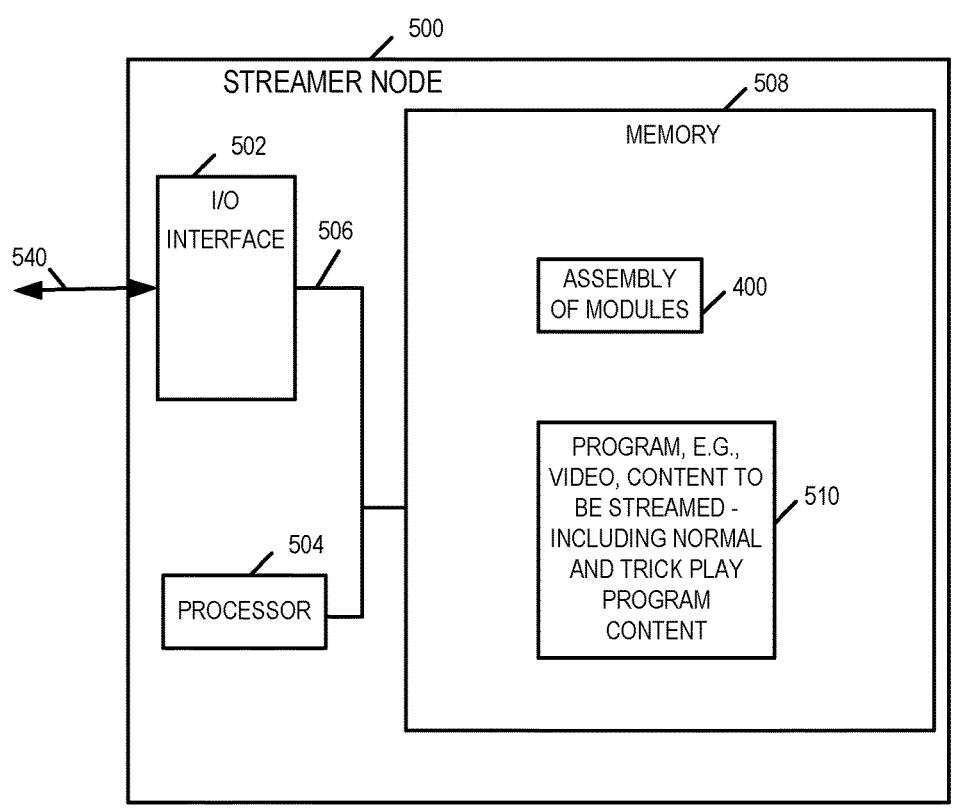
FIG. 5 illustrates an exemplary streamer node which includes the assembly of modules shown in FIG. 4.

FIG. 5 illustrates a streamer node 500 which performs the VOD server and local cache functions of a streamer node, e.g., node 116 shown in FIG. 1. The streamer node 500 includes an input/output interface 502, a processor 504 and memory 508 which are coupled together by a bus 506. The memory includes the assembly of modules 400 shown in FIG. 4 and program, e.g., video, content to be streamed 510. The program content 510 includes normal and trick play files and/or tracks to support both normal playback and trick playback operation. The I/O interface is coupled to other network elements and nodes, e.g., regional caches and/or the national VOD library 102 via communications link 540. The modules control the processor 504 to operate in accordance with the invention to implement the steps of the method shown in FIG. 2. It should be appreciated that the streamer node may be implemented using multiple memory, e.g., storage devices and/or processors with the functions of the method distributed between them. Thus, the VOD sever functionality and local caching functionality may be divided in some embodiments as shown in FIG. 113 with the elements used to implement the streamer node often being located at the same content distribution site and thus appearing as a single node to other elements in the communications system.

Various methods and apparatus are well suited for use in a hierarchical content distribution system, e.g., VOD system, with different cache levels. Various methods and apparatus support the ability to move content that may be located at one or more sites, e.g., a national library, a regional library, a division cache, etc., to a streamer to satisfy a stream request from a user, e.g., a real-time stream request. Various embodiments provide trick mode support for FFWD and REW. Some such embodiments support multi-speed trick modes in both directions, such as, e.g., 4×, 10× and 32× in both directions.

The techniques of the present invention may be implemented using software, hardware and/or a combination of software and hardware. In the case of software, computer executable instructions used to control a processor may be stored in memory or another storage device and then executed by a processor. The present invention is directed to apparatus, e.g., cache nodes including a server and a local cache. It is also directed to methods, e.g., method of controlling and/or operating communication system elements to implement one or more portions of the methods of the invention. The present invention is also directed to machine readable medium, e.g., ROM, RAM, CDs, hard discs, etc., which include machine readable instructions for controlling a machine to implement one or more steps in accordance with the present invention.

In various embodiments system elements described herein are implemented using one or more modules to perform the steps corresponding to one or more methods of the present invention, for example, communication detection, communication disposition, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

The methods and apparatus of the present invention, are applicable to and can be used with a one or a combination of systems including cable systems, satellite systems, PSTN systems, cellular systems, etc.

Numerous additional variations of the methods and apparatus of the present invention described above will be apparent to those skilled in the art in view of the above description of the invention. Such variations are to be considered within the scope of the invention.

What is claimed is:

1. A method of operating an apparatus, the method comprising:
receiving, via an interface of the apparatus, trick play data including frames corresponding to a second portion of a program, said receiving of trick play data corresponding to the second portion of the program preceding receiving of a subset of normal play frames corresponding to a first portion of the program, said first portion preceding said second portion in said program;
receiving, via the interface of the apparatus, at least some additional data required to complete a set of normal playback data, during a time period in which said trick play data corresponding to the second portion of the program is received, said additional data including both I and P frames;
updating, using received frame data, normal playback rate data, said updating including combining said subset of normal play frames corresponding to the first portion of the program received during said time period in which trick play frames corresponding to the second portion of the program are received with a previously received subset of frames corresponding to the first portion of said program to generate a normal play set of data corresponding to the first portion of the program; and
storing: i) the trick play data corresponding to the second portion of the program in a trick play file in memory and ii) the generated normal play set of data in a normal play file in said memory.

2. The method of claim 1, wherein said time period in which said trick play data corresponding to the second portion of the program is received is a time period in which at least some normal play data corresponding to the program is received in a stream to facilitate completion of the normal play data while said trick play data is also streamed to said apparatus.

3. The method of claim 2, wherein said trick play data and normal play data is received from a remote cache; and
wherein the data rate between the remote cache and said apparatus is less than twice the data rate used to support normal playback of the program being streamed.

4. The method of claim 1, further comprising, prior to receiving the trick play data corresponding to the second portion of the program:
receiving a first set of trick play data corresponding to the first portion of the program, said first set of trick play data being said previously received subset of frames corresponding to said first portion of said program, said previously received subset including fewer frames than the normal play set of data; and
storing said first set of trick play data in said memory.

5. The method of claim 4, further comprising:
storing said generated normal play set of data in memory separately from said stored received first set of trick play data.

6. The method of claim 1, further comprising,
sending a request to a remote frame storage device for frames corresponding to said set of normal play data which were not included in the received first set of trick play data.

7. The method of claim 6, wherein said request includes information identifying at least some frames corresponding to said first portion of said program.

8. The method of claim 1, wherein receiving, via the interface of the apparatus, at least some additional data required to complete a set of normal playback data, during a time period in which said trick play data corresponding to the second portion of the program is received, includes:
receiving missing I frames corresponding to said first portion of said program prior to receiving missing predictively coded frames.

9. The method of claim 8, wherein receiving, via the interface of the apparatus, at least some additional data required to complete a set of normal playback data, during a time period in which said trick play data corresponding to the second portion of the program is received, further includes:
receiving missing P frames after receiving missing I frames.

10. The method of claim 8, further comprising:
receiving said frames corresponding to said first portion of the program which were not included in said received first set of trick play data includes receiving missing B frames after receiving missing P frames.

11. An apparatus for providing video content representing a program, comprising:
a memory;
an interface; and
a processor, the processor being configured to control the apparatus to:
receive, via the interface of the apparatus, trick play data including frames corresponding to a second portion of a program, said receiving of trick play data corresponding to the second portion of the program preceding receiving of a subset of normal play frames corresponding to a first portion of the program, said first portion preceding said second portion in said program;
receive, via the interface of the apparatus at least some additional data required to complete a set of normal playback data, during a time period in which said trick play data corresponding to the second portion of the program is received, said additional data including both I and P frames;

update, using received frame data, normal playback rate data, said updating including combining said subset of normal play frames corresponding to the first portion of the program received during said time period in which trick play frames corresponding to the second portion of the program are received with a previously received subset of frames corresponding to the first portion of said program to generate a normal play set of data corresponding to the first portion of the program;

store: i) the trick play data corresponding to the second portion of the program in a trick play file in memory and ii) the generated normal play set of data in a normal play file in said memory.

12. The apparatus of claim 11, wherein said time period in which said trick play data corresponding to the second portion of the program is received is a time period in which at least some normal play data corresponding to the program is received in a stream to facilitate completion of the normal play data while said trick play data is also streamed to said apparatus.

13. The apparatus of claim 12, wherein said trick play data and normal play data are received from a remote cache; and wherein the data rate between the remote cache and said apparatus is less than twice the data rate used to support normal playback of the program being streamed.

14. The apparatus of claim 11, wherein said apparatus receives, via said interface prior to receiving the trick play data corresponding to the second portion of the program, a first set of trick play data corresponding to the first portion of the program, said first set of trick play data being said previously received subset of frames corresponding to said first portion of said program, said previously received subset including fewer frames than the normal play set of data; and wherein said processor is further configured to control said apparatus to store said received first set of trick play data in said memory.

15. The apparatus of claim 14, wherein said processor is further configured to control said apparatus to store said generated normal play set of data in memory separately from said stored received first set of trick play data.

16. The apparatus of claim 11, wherein as part of being configured to control the apparatus to receive, via the interface of the apparatus, at least some additional data required to complete a set of normal playback data, during a time period in which said trick play data corresponding to the second portion of the program is received, said processor is further configured to control said apparatus to receive, via said interface, missing I frames corresponding to said first portion of said program prior to receiving missing predictively coded frames.

17. The apparatus of claim 16, wherein as part of being configured to control the apparatus to receive, via the interface of the apparatus, at least some additional data required to complete a set of normal playback data, during a time period in which said trick play data corresponding to the second portion of the program is received, said processor is further configured to control said apparatus to, receive, via said interface, missing P frames after receiving missing I frames.

* * * * *